P. Hessemer,

Toy Hoop.

No. 104,150.      Patented June 14, 1870.

Witnesses            Phil Hessemer, Inventor
Henry J. Stritz      by Munn & Co
E. A. Pettit             his Attorneys

United States Patent Office.

PHILIPP HESSEMER, OF WASHINGTON, DISTRICT OF COLUMBIA.

Letters Patent No. 104,150, dated June 14, 1870.

TOY HOOP.

The Schedule referred to in these Letters Patent and making part of the same.

To all whom it may concern:

Be it known that I, PHILIPP HESSEMER, of the city and county of Washington, in the District of Columbia, have invented a new and improved Toy Hoop; and I do hereby declare that the following is a full, clear, and exact description of the same, reference being had to the accompanying drawing making a part of this specification, in which—

Figure 1:
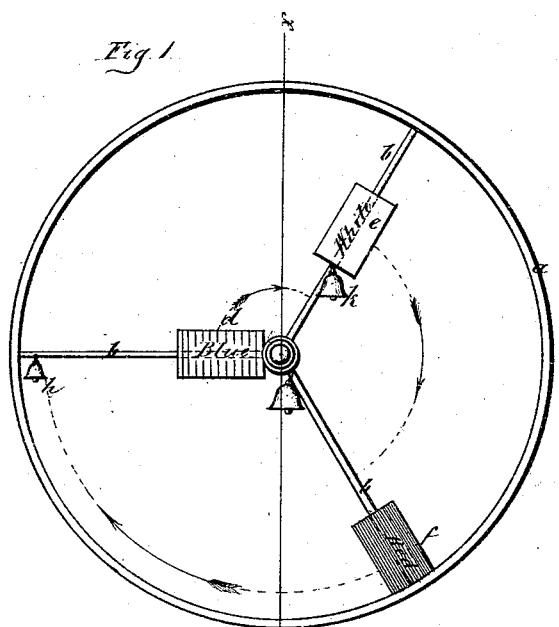
Figure 2:
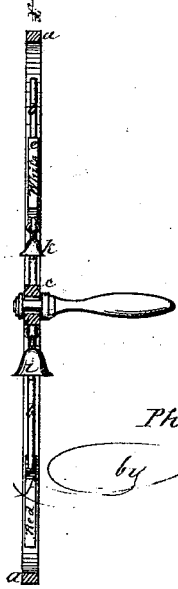

Figure 1 is a side elevation, and
Figure 2 is a sectional elevation.

This invention consists in the combination of tags painted in different colors with the spokes of a hoop, one tag to each spoke, and in the arrangement of one tag near or next to the hub of the hoop, the second tag at a distance from the hub greater then the length of the first, the third tag at a distance from the hub greater than twice the length of the first, and so on, in order that, when the hoop is rapidly revolved, it may show as many separate concentric colored rings as there are tags.

The invention also consists in the combination with the spokes of the hoop, when the latter are provided with the tags, as before described, of bells, one to each spoke, arranged at such varying distances from the hub as to operate as supplementary weights to the tags, and preserve the equilibrium of the hoop.

In the drawing—
$a$ is the hoop.
$b$, the spokes.
$c$, the hub.

$d\ e\ f$, the tags, of which there are, in this instance, three, one blue, another white, and the third red, the blue tag being next the hub, the white tag being at a distance from the hub greater the length of the blue one, and the red tag being next the rim of the hoop, and at a distance from the hub greater than the combined lengths of the blue and white; and $h\ i\ k$, the bells, of which $h$ operates as a supplementary weight to the blue tag, $i$ to the red tag, and $k$ to the white tag, and which, by their tinkling when the hoop is in motion, add to the attractiveness of the toy.

This hoop shows three well-defined rings when in motion, the outer one being red, the middle one white, and the inner one blue.

Having thus described my invention,

What I claim as new, and desire to secure by Letters Patent, is—

1. The combination of the hoop $a$, spokes $b$, and tags $d\ e\ f$, when the latter are arranged upon the spokes, substantially in the manner described, and for the purpose set forth.

2. The combination of the hoop $a$, spokes $b$, tags $d\ e\ f$, and bells $h\ i\ k$, when the latter are arranged to operate as supplementary weights, substantially as described.

PHILIPP HESSEMER.

Witnesses:
    SOLON C. KEMON,
    D. OURAND.